(12) United States Patent
Wilson et al.

(10) Patent No.: US 6,470,025 B1
(45) Date of Patent: Oct. 22, 2002

(54) SYSTEM FOR PROVIDING FAIR ACCESS FOR VLANS TO A SHARED TRANSMISSION MEDIUM

(75) Inventors: Peter J. Wilson, Welwyn Garden City (GB); Paul J. Moran, Hemel Hempstead (GB)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/241,477

(22) Filed: Feb. 2, 1999

(30) Foreign Application Priority Data

Jun. 5, 1998 (GB) .............................. 9812065

(51) Int. Cl.[7] .............................. H04J 3/02; H04L 12/26
(52) U.S. Cl. .................... 370/462; 370/235; 370/447
(58) Field of Search ................... 370/229–236, 370/411–418, 468, 397, 428, 429, 444, 445, 447, 448, 461–462, 395.4–395.43; 709/224, 225, 226, 229, 227, 228, 233, 235, 240

(56) References Cited

U.S. PATENT DOCUMENTS 5,499,238 A * 3/1996 Shon ........................ 370/415
5,768,271 A * 6/1998 Seid et al. .................. 370/397
6,104,700 A * 8/2000 Haddock et al. ............ 370/235
6,115,356 A * 9/2000 Kalkunte et al. ........... 370/235

* cited by examiner

*Primary Examiner*—Steven Nguyen
(74) *Attorney, Agent, or Firm*—Nixon & Vanderhye P.C.

(57) ABSTRACT

A method of controlling access to a common physical data transmission link from a multiplicity members of a packet-based local area network, wherein the members are partitioned into a plurality of virtual local area networks (VLANs) and wherein packets are identified according to the virtual local area network from which they come, comprises (a) monitoring packet traffic from the virtual local area networks on the link and thereby obtaining measures of the traffic flow from each of the virtual local area networks; (b) determining whether the traffic flow for each respective VLAN is above or below a threshold; (c) denoting a VLAN which is above its threshold as in a restricted state and denoting a VLAN which is below its threshold as in a priority state; (d) arbitrating between requests from the VLANs to transmit data packets on the link; and (e) according priority in the arbitration to a VLAN which is in a priority state over any VLAN which is in a restricted state. A request to transmit is gated with a signal denoting the state of the respective VLAN to provide a set of priority requests. In response to the presence of any priority request the arbitration is made only in respect of the set of priority requests and in the absence of a priority request arbitration is made in respect of the VLANs which indicate a request to transmit. A 'leaky bucket' counter may be used for monitoring the traffic for each VLAN.

12 Claims, 1 Drawing Sheet

SYSTEM FOR PROVIDING FAIR ACCESS FOR VLANS TO A SHARED TRANSMISSION MEDIUM

BACKGROUND OF THE INVENTION

Traditionally, many local area network (LAN) protocols indiscriminately send traffic to many or all other stations connected to the local area network. The addressing of many stations with a single message is generally called a 'multicast' communication. A special and frequent case of this is a message which has to be received by all stations connected to the network. Generally, this does not cause difficulty, but there may be occasions when the level of multicast traffic has limited the performance of the local area network. One type of occasion arises from the use of multicast messages for administrative purposes, for example to locate other stations on the network. When the number of stations on the same local area network becomes large so can the level of administrative multicasts. This may use significant proportions of the available bandwidth, i.e. the information carrying capacity of the network or may cause degradation of the end-stations' performance because a large number of these messages have to be processed.

There may be conditions wherein 'rogue' stations enter states whereby they continually transmit messages to the broadcast address. In theory, if such a condition were to arise, a large proportion of a network's band width could be utilised by these messages.

Further, if two network ports on the same local area network are connected together, a loop is produced. Ideally, the network devices would detect such a loop and shut down one of the relevant links but such a fault is not always corrected in this way. If a loop does occur in the local area network then the network is liable to become unusable.

More recently, networks have been designed to limit the effect of any 'multicast' storms that may happen. A common and preferred mechanism is to partition a local area network into a multiplicity of smaller local area networks, which are connected together using routers. Routers may monitor traffic and thereby enable a significant level of control over the passage of information between local area networks. Thus a 'multicast storm' on one local area network would not cause cessation of operation of another local area network.

If a system of this nature is employed, when a user wishes to connect a device to a specific local area network, the device is physically 'patched' through to a physical local area network implemented by a set of network devices. The only interaction between the local area networks is controlled by a router.

As networks have evolved, and as organisations have evolved, the use of hardwired networks using physical patch panels has become cumbersome. In simple terms, if physical patch panels are used then if a particular person in a organisation has shifted physical location, the physical change in location has to be accompanied by a physical change in the network topology via a patch panel. Additional network devices may be needed if changes in physical locations of users cause local network connections to be insufficient. Further, as organisations have split into smaller working units, the number of local area networks has expanded.

The concept of a virtual local area network allows a virtual patch panel to be implemented in the same devices that implement the network infrastructure. Each end station can be attached to a separate virtual local area network under software control. Virtual local area networks are, from the point of view of users or end stations, functionally similar to physical local area networks but are defined by software control of the addressing of data packets and other necessary or consequential control functions. For example, if a member (typically called client or user) in a virtual local area network has a message which is to be broadcast to all the members of the virtual local area network, then the message is treated as a multicast message and (by means well enough known not to require further description here) sent to all the other members of that virtual local area network but not to other users in the physical local area network which is partitioned into the multiplicity of virtual local area networks.

Nevertheless, somewhere in the network there must be a router which allows communication between the various virtual local area networks. Generally, each VLAN might need a separate physical connection to a router. This is inconvenient, because although the VLAN allows automatic connection of an end station to a VLAN, the network administrator must add an extra physical connection.

To avoid this, it is possible to multiplex multiple virtual local area networks over a single physical medium. A variety of schemes of achieving this exist but each depends on the tagging of each packet or data frame with a value identifying the VLAN to which the frame belongs.

This solves the problem of physical connections to the router but creates a new problem. The network was divided into VLANs to prevent traffic from one local area network from inhibiting access to all other networks. Now all the traffic from a multiplicity of VLANs is carried across a single physical connection, which has necessarily limited bandwidth. Again, a multicast storm on one segment may occupy all the available bandwidth on the shared, tagged link and again prevent or degrade performance on an unrelated local area network.

SUMMARY OF THE INVENTION

The invention is intended for use where data from a multiplicity of users in a plurality of virtual local area networks (VLANs) has to be multiplexed over a single physical link, and where, as indicated above, the aggregate traffic of all the VLANs together may exceed the maximum information carrying capacity of that physical link. The invention provides a scheme for according fair access to the single physical link.

A preferred but not in all respects essential technique according to the invention is as follows.

Means may be provided to monitor the traffic provided by each virtual local area network coupled to the physical link. The monitoring of that traffic may be gauged against that threshold or quota such that if the traffic from a particular VLAN exceeds a quota allocated thereto a state denoted 'restricted' is indicated in any desired manner. For a traffic flow below the quota, a 'priority' state is indicated. When the VLAN wishes to send a packet over the physical link it asserts a request signal (R). When the shared link is ready to accept a packet it may first search for requests from all VLANs which are indicated to be in the 'priority' state. A packet from a VLAN in the 'priority' state will always be accepted in preference to a packet from a VLAN in the 'restricted' state. If a VLAN in a 'priority' state sends a frame, that increment of traffic can cause the VLAN to exceed its quota, so that it will then enter the 'restricted' state. A variety of developments of such a scheme are possible. In particular, the quotas may be programmable or adaptive. They may for example be set in proportion to the number of 'clients' or users in each respective VLAN. Nevertheless the monitoring may indicate that the quotas for some VLANs need to be adjusted in accordance with monitor traffic flows to give greater preference to some VLANs over others. Furthermore, although the arbitration scheme envisaged as preferential is a round robin arbitration scheme so that a VLAN having priority is given unconditional access, it may be feasible to adapt the technique to a contention-resolution scheme, e.g. carrier sense multiple access, wherein a VLAN having priority is favoured in the contention-resolution process and a 'restricted' VLAN is not.

Various other schemes for setting the quota for the various VLANs connected to the physical link are possible. It is feasible to over subscribe the physical link. For example, if there were four 'clients' using a link, then the threshold for all the links could be set to 60%. The effect of this is that no single VLAN could consume more than 60% of the available bandwidth (information carrying capacity) if there were other VLANs which wish to send data.

DETAILED DESCRIPTION OF A PREFERRED EMBODIMENT

Figure 1:
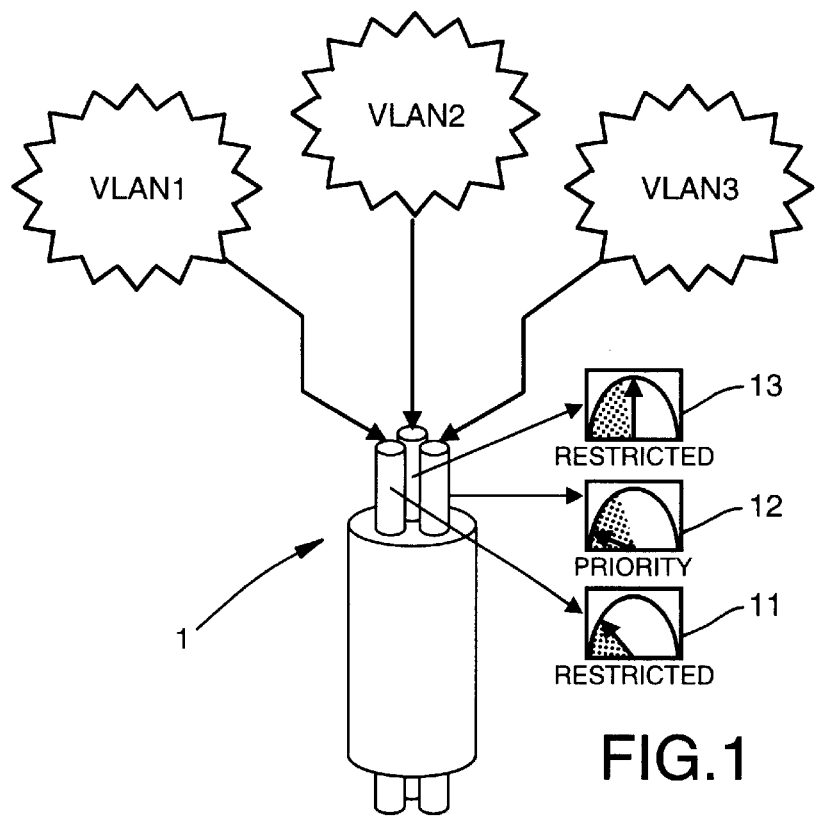
FIG. 1 is a simplified diagram of a monitoring function performed on each VLAN connected to a shared transmission medium.

FIG. 1 illustrates in simplified form part of a local area network wherein three virtual local area networks defined in the local area network share a common physical data transmission link. As indicated in the foregoing, a virtual local area network (VLAN) has all the benefits of a normal LAN but allows an administrator to configure which devices are connected to which VLAN through software control. This introduces a problem that the switch to which the device is to be attached must actually have a connection to each VLAN. Traditionally, this would have required a physical link between each switch for each VLAN to be supported. Such an arrangement does not scale. A solution is to allow traffic from a multiplicity of VLANs to be carried over a single link 1. Thus in the scheme of FIG. 1, packets from each of the three VLANs VLAN 1, VLAN 2 and VLAN3 are, under software control, tagged to identify their VLAN. A disadvantage to this scheme is that it is partially in contradiction to the idea of having separate VLANs. One of the reasons for partitioning the network into VLANs is to prevent excessive traffic from one group of users having an adverse effect on the service or performance of users on another VLAN. In a scheme such as FIG. 1, where traffic from a multiplicity of VLANs is carried across a single connection, typically an Ethernet connection, large bursts of traffic from one VLAN may saturate the link and prevent access to the medium from another VLAN.

Methods exist for the monitoring of traffic by examination of, for example, packet or frame headers including identifications of source, destination or other data. In the scheme illustrated in FIG. 1, the link (or port) 1 may be adapted to monitor all traffic from each VLAN independently. The monitoring is illustrated by the three notional 'gauges' 11, 12 and 13 for the VLANs VLAN 1, VLAN 2 and VLAN 3 respectively. Each of the gauges is shown with a threshold, denoted by the transition from shaded to clear portions in the gauge. If the measured traffic for a particular VLAN is above the respective threshold then that VLAN is deemed to have 'restricted' access to the physical medium. If the measured traffic for that VLAN is below the threshold, the VLAN has 'priority' access to the physical medium. Various conventional measures of traffic flow may be employed, such as bits (or octets) per unit time.

In the illustration of FIG. 1, VLAN 1 and VLAN 3 are providing the traffic above the threshold or quota and accordingly they are deemed to have restricted access to the physical link, whereas the traffic from VLAN 2 is below the quota and accordingly VLAN 2 is deemed to have priority access to the physical link.

In the simple scheme, a frame from VLAN 2 can always be accepted in preference to a frame from the other VLANs. Such a condition would continue until VLAN 2 exceeded its quota or one of the other VLANs had sent so little data that it entered the priority state.

One monitoring mechanism is to provide a traffic counter which is decremented at a fixed rate and incremented each time traffic is sent from the respective VLAN to the link. A threshold is set according to the relevant averaging period to implement the required quota. Generally, when the average data rate from a VLAN is below its quota the counter will decrement more quickly than it increments and so it will be permanently 'empty', i.e. at a state which denotes emptiness. If the data rate exceeds the decrementing rate then the counter will gradually increment until it exceeds a predetermined count which denotes the quota. Such a monitoring mechanism is conveniently called a 'leaky bucket' and is more particularly described in the commonly assigned co-pending application Ser. No. 09/093,287 (based on GB application number 9807264.8 filed Apr. 3, 1998).

Figure 2:
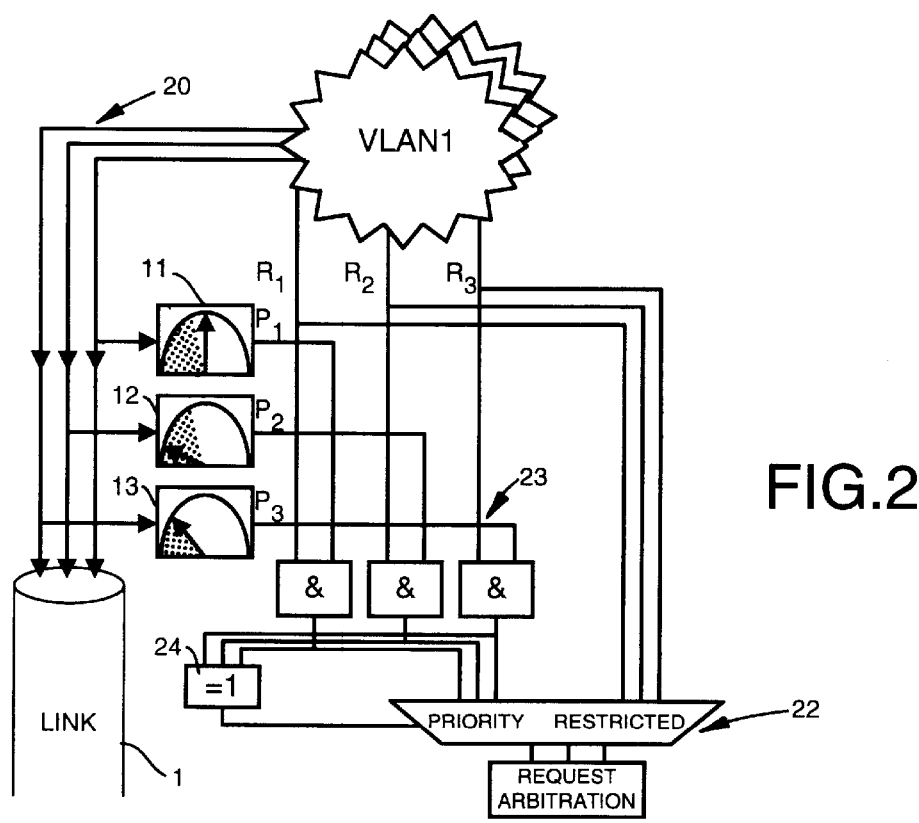
FIG. 2 illustrates a system of control according to the invention.

FIG. 2 illustrates how the control may be achieved. As in FIG. 1, the VLANs are connected to the physical link 1. Although the connections from the VLANs are shown as wires 20, it will be understood that all the members of the multiplicity of VLANs are physically coupled to the link 1 but that it is possible to distinguish, as indicated above, between traffic from the various VLANs. Thus although the counters 11, 12 and 13 are shown as coupled to separate ones of the wires 20, in reality there is a single physical connection coupled to a filtering function to distinguish between traffic from the various VLANs and respective counters which count the filtered traffic counts.

The purpose of the monitoring function is to generate a priority decision signal ($P_i$). If 'priority' is true, then the associated VLAN is below its quota and the priority decision signal or priority flag is asserted.

Each VLAN has a request signal $R_i$ which is asserted when that VLAN wishes to send packet over the link 1. The set of signals $R_i$ from the VLANs are called the 'restricted' set. These are received as inputs to a selector 22. The 'restricted set' are also respectively gated with the priority flags from the monitors 11, 12 and 13 so that the output from the respective one of the AND gates 23 is asserted if a request signal is asserted and the respective monitor has asserted a priority flag. The outputs from the AND gates constitute a second set of inputs, the set of 'priority requests', to the selector.

The AND gate outputs are monitored, for example by an OR gate 24, so as to determine whether any of the priority requests are asserted. The selector is arranged so that if there is an output from the OR gate, indicating that at least one of the VLANs is in a priority state and is requesting access, the selector selects the priority signals, that is to say it arbitrates only between those VLANs which are in the priority state. If however no priority request is asserted, then the restricted set is chosen and the arbitration scheme arbitrates between the members of the restricted set. Thus, if there are no priority requests then the restricted sets will be searched. This means that the entire information carrying capacity can be utilised but that each VLAN is guaranteed its allocated quota.

If a VLAN is blocked from sending frames because it has exceeded its quota and there is not available spare bandwidth then packets may be lost. A VLAN may delay sending requests until its monitoring indicates that the VLAN is below its quota. Buffering may be employed, in conjunction with flow control if desired or necessary, to avoid excessive consumption of buffering capacity.

What is claimed is:

1. A method of controlling access to a common physical data transmission link from a multiplicity of members of a packet-based local area network wherein the members are partitioned into a plurality of virtual local area networks (VLANs) and wherein packets are identified according to the virtual local area network from which they come, the method comprising:
   (a) monitoring packet traffic from the virtual local area networks on said common physical data transmission link and thereby obtaining measures of the traffic flow from each of the virtual local area networks;
   (b) determining whether the traffic flow for each respective VLAN is above or below a threshold;
   (c) denoting a VLAN which is below its threshold as in a priority state and denoting a VLAN which is above its threshold as in a restricted state;
   (d) arbitrating between requests from the VLANs to transmit data packets on said common physical data transmission link; and
   (e) according priority in the arbitration to a VLAN requesting to transmit which is also in a priority state over any request from a VLAN which is in a restricted state.

2. A method according to claim 1 wherein each request to transmit is gated with a signal denoting the state of the respective VLAN to provide a set of priority requests and wherein:
   in response to the presence of any priority request the arbitration is made only in respect of the set of priority requests, and
   in the absence of a priority request, arbitration is made in respect of the VLANs which request to transmit.

3. A method according to claim 1 wherein the traffic flow from each VLAN is monitored by means of a counter which is decremented at a fixed rate and is incremented in accordance with the traffic flow for its respective VLAN which is denoted as in the restricted state when the counter attains a threshold count.

4. A method according to claim 2 wherein the traffic flow from each VLAN is monitored by means of a counter which is decremented at a fixed rate and is incremented in accordance with the traffic flow for its respective VLAN which is denoted as in the restricted state when the counter attains a threshold count.

5. A device for monitoring and controlling a traffic flow from each of a plurality of VLANs over a common physical data link, the traffic flow comprising data packets which include identification of the VLAN from which a packet comes, said device comprising:
   means for monitoring the traffic from each VLAN and producing a signal indicating a restricted state of a VLAN when the traffic exceeds a respective threshold;
   means for gating each of respective said signals with a signal indicating a request from the VLAN to transmit whereby to produced a priority request for a VLAN in a priority state; and
   a selector which enables selection of all the requests to transmit in the absence of a priority request and preferentially enables the selection of a priority request if any VLAN indicates a request to transmit and is in a priority state.

6. A device according to claim 5 comprising for each VLAN a counter which is decremented at a constant rate and is incremented is response to the traffic from the respective VLAN.

7. A method of controlling access to a common physical data transmission link of packet traffic from a multiplicity of members of a packet-based local area network wherein said members are partitioned into a plurality of virtual local area networks (VLANs) and wherein said packet traffic comprises packets which are identified according to the VLAN from which they come, the method comprising:
   (a) monitoring said packet traffic from the virtual local area networks on said link and thereby obtaining measures of the respective packet traffic from each of the VLANs;
   (b) determining whether the respective packet traffic from each VLAN is above or below a respective threshold;
   (c) denoting a VLAN for which the packet traffic is below the respective threshold as in a priority state and denoting a VLAN for which the packet traffic is above the respective threshold as in a restricted state;
   (d) providing a request to transmit from each VLAN which has packets to transmit on said link;
   (d) arbitrating between such requests to transmit to control access to said link; wherein priority is accorded in the arbitrating step to a VLAN which is in a priority state over any VLAN which is in restricted state.

8. A method as in claim 7 wherein said step of arbitrating comprises:
   providing a priority signal for any VLAN which is in a priority state;
   gating a request to transmit from a VLAN with any priority signal for the same VLAN to provide a set of priority requests denoting those VLANs which are in a priority state and have packets to transmit;
   in the presence of any priority request, arbitrating between only those priority requests in the set of priority requests; and
   in the absence of any priority request, arbitrating between the requests to transmit from the VLANs which have made a request to transmit and are in a restricted state.

9. A method as in claim 7 wherein said monitoring step comprises:
   monitoring the respective packet traffic from each VLAN by means of a respective counter which is decremented at a fixed rate and is incremented in accordance with the respective packet traffic from the VLAN;
   denoting the VLAN as in the priority state when a respective count is below a threshold count, and
   denoting the VLAN as in the restricted state when the count is above the threshold count.

10. A device for monitoring and controlling packet traffic from a plurality of VLANs over a common physical data link, said packet traffic comprising data packets which include identification of the VLAN from which a data packet comes, said device comprising:

means for monitoring the respective traffic from each VLAN to determine whether the VLAN is in a priority state, when the respective packet traffic is less than a respective threshold, or in a restricted state when the respective traffic is above the respective threshold;

means for making for each VLAN request when that VLAN has packets to transmit on said link; and selector means which makes an arbitration between requests from the VLANs to control access to said link from the VLANs; wherein said selector accords preference in said arbitration to a request from any VLAN which is in a priority state over any VLAN which is in a restricted state.

11. A device as in claim 10 wherein said selector means comprises:

means for producing a priority signal for each VLAN in a priority state;

means for gating each request for a VLAN with any priority signal from the same VLAN to provide a set of priority request signals indicating those VLANs which have made a request and which are in a priority state;

means for detecting the presence of any priority request signal; and a selector operative in the presence of any priority request signal to arbitrate between the priority requests in the set of priority requests and in the absence of any priority request signal to arbitrate between requests from VLANs which are in the restricted state.

12. A device as in claim 10 wherein the means for monitoring comprises for each VLAN a counter which is decremented at a fixed rate and is incremented in accordance with the respective traffic so as to produce a priority signal when a resultant count denotes packet traffic below the respective threshold for that VLAN.

\* \* \* \* \*